United States Patent [19]

Holler

[11] 3,908,002

[45] Sept. 23, 1975

[54] PRODUCTION OF ALPHA ALUMINA

[75] Inventor: Howard V. Holler, Oakland, Calif.

[73] Assignee: Shell Oil Company, Houston, Tex.

[22] Filed: May 30, 1972

[21] Appl. No.: 257,523

[52] U.S. Cl. .............. 423/628; 252/463; 423/630; 423/600
[51] Int. Cl.² ..................... C01F 7/30; C01F 7/02
[58] Field of Search ............................ 423/628, 630

[56] References Cited
UNITED STATES PATENTS

| | | | |
|---|---|---|---|
| 2,595,415 | 5/1952 | Schmerling | 423/628 X |
| 2,697,066 | 12/1954 | Sieg | 423/628 UX |
| 3,108,888 | 10/1963 | Bugosh | 423/628 X |
| 3,180,741 | 4/1965 | Wainer et al. | 423/630 X |
| 3,352,635 | 11/1967 | Machin et al. | 423/630 X |
| 3,417,028 | 12/1968 | Montgomery et al. | 423/628 X |
| 3,758,418 | 9/1973 | Leonard et al. | 423/630 UX |

OTHER PUBLICATIONS

Dawihl et al., "Berichte Deutsche Keramische Gesellschaft," Vol. 41, pp. 365–368 (1964).

Primary Examiner—Herbert T. Carter

[57] ABSTRACT

Inorganic compositions including high surface area α-aluminas are produced from the salts of polycarboxylic acids containing aluminum and optionally other metal ions via: (a) the thermal decomposition of the salt in an inert atmosphere to produce a carbonaceous char which is subsequently oxidized to remove the majority of the carbon and leave the inorganic phase, (b) the thermal decomposition of this salt in an inert atmosphere to produce a carbonaceous char which is subsequently heated in an inert atmosphere to effect changes in the inorganic phase present and then is oxidized to remove the majority of the carbon and leave the inorganic phase, or (c) the direct ignition of this salt in an oxygen rich gas mixture.

4 Claims, No Drawings

PRODUCTION OF ALPHA ALUMINA

BACKGROUND OF THE INVENTION

1. Field of the Invention

This invention relates to a process for the production of inorganic compositions, including high surface area α-alumina, useful as catalysts and catalyst supports.

2. Description of the Prior Art

J. W. Newsome et al., "Alumina Properties", 18, Alcoa Research Laboratories Technical Paper No. 10, *Second Revision*, Aluminum Company of America, Pittsburg, 1960, report that alpha alumina usually has surface area less than 1 $m^2/g$. A high surface area form has also been prepared; A. S. Russell et al., *Ind. Eng. Chem.*, 42, 1336 (1950) disclose that heating diaspore mineral, a form of beta alumina monohydrate, at 650°C produced a material having appreciable surface area, about 49 $m^2/g$, and showing the X-ray pattern of alpha alumina. However, diaspore is a relatively rare form of alumina. H. Krischner et al, in G. H. Stewart, "Science of Ceramics", 63, Vol. 1, Academic Press, London and New York, 1962, report two methods for producing microcrystalline, active alpha alumina. The first method comprises the thermal hydrolysis of aluminum fluoride under special conditions. The second encompasses the reaction of metallic aluminum with steam under pressure from 15 to about 100 atmospheres at temperatures between 320° and 400°C.

In copending U.S. patent application Ser. No. 126,982, filed Mar. 22, 1971, of W. J. Leonard, Jr., it is disclosed that when certain metal ion chain-bridged polymeric carboxylates are thermally decomposed at 100°–450°C, high surface area organic matrix polymers containing small particles of metal or metal oxides are produced. Such a process could be used to form small particles of alumina having a substantial surface area, but these particles would be dispersed in organic matrixes polymers, a form not particularly useful for use in catalyst preparation and the like. These inorganic inclusions may not be in the desired crystalographic form following this thermal decomposition at relatively low temperatures either.

STATEMENT OF THE INVENTION

It is now been found that essentially pure alpha-alumina having a surface area of at least about 40 $m^2/g$ is produced by thermally decomposing a porous aluminum ion chain-bridged polymeric carboxylate up to a temperature of from about 300°C to about 600°C in a vacuum, heating the resulting decomposition product to a temperature above about 1000°C in an inert atmosphere and finally removing the residual carbon from the decomposition product by conversion to a gaseous carbon oxides at temperatures in the 400° to 900°C. The latter burn off temperature is kept low enough to prevent sintering of the inorganic phase which results in loss of surface area.

DETAILED DESCRIPTION OF THE INVENTION

Starting Materials

The starting materials employed in the process of this invention are porous aluminum ion coordinated salts of polyacid polymers. The latter are derived by the polymerization of monomers containing at least one carboxylic acid group and one ethylene unit per monomer unit. The monomeric acids may also contain additional carbon-carbon unsaturation in the molecules, such as aromatic unsaturation. Suitable acids include, for example, acrylic acid, maleic acid, m-vinylbenzoic acid and the monovinyl ester of phthalic acid.

Preferred as starting materials are the aluminum ion-linked salts of polymerized lower ethylenically unsaturated acids wherein the acid precursor contained from one to two carboxy groups, and from one to two ethylenic linkages as the sole carbon-carbon unsaturation and contain from 3 to 6 carbon atoms, per monomeric unit, for examaple, acrylic acid, maleic acid, fumaric acid, sorbic acid, crotonic acid and the like. Especially preferred starting materials are salts of polymerized monocarboxylic alkenoic acids of from three to six carbon atoms. Examples of these preferred materials include the aluminum ion-linked salts of polymerized (500–2,000,000 average molecular weight) acrylic acid, methacrylic acid, crotonic acid, maleic acid, sorbic acid, and ethacrylic acid. Most preferred polymeric acids, for employment in the starting materials are 2,000–500,000 average molecular weight polymers of acrylic acid and alpha-alkyl derivatives thereof wherein the alkyl has from one to three carbon atoms. The molecular weight upper limit is not critical, being limited primarily because of ease of handling these lower weight materials. The starting materials generally contain from 0.1 to 1.0 moles of aluminum ion per equivalent of acid, that is from about 0.3 to about 3.0 equivalents of aluminum ion per equivalent of polyacid. In addition to aluminum ion, other polyvalent transition metal ions may be present in the porous ion cross-linked polycarboxylate starting materials; in these cases alumina and aluminate final products containing these potentially catalytic ions may be prepared.

One method for preparing these starting materials comprises the steps of, (A) contacting a generally dilute (preferably 0.05 to 1.0 molar) non-aqueous solution of suitable polymerized acid with from 0.2 to 5 equivalents of aluminum ions per equivalent of polyacid in solution in a similar solvent at a temperature in the range of 0–100°C; (B) separating the gelatinous precipitate of amorphous aluminum-ion-linked polymer which results from the reaction solvent; and (C) removing residual solvent from the amorphous polymer such as by heat or vacuum, thus producing the rigid porous aluminum ion chainbridged starting material. This starting material is then treated by the process of this invention to give a high surface area alumina.

The solvents for the polymerized acid and the aluminum salts and the medium of their contact are inert, preferably non-aqueous and polar. If different solvents are employed for the polyacid and the metal salts, each solvent should be selected so as not to cause precipitation of either reactant prior to reaction when the solution of polyacid and metal salt are combined. Suitable solvents include polar substituted hydrocarbons, for example, oxygenated hydrocarbons such as alcohols, ketones, and cyclic ethers, preferably of from 1 to 6 carbon atoms. Illustrative of such solvents are methanol, ethanol, isopropanol, ethylene glycol, n-hexanol, acetone, methyl isobutyl ketone, dioxane, tetrahydrofuran, and their mixtures as well as other substituted hydrocarbons such as acetonitrile, dimethylformamide, dimethylsulfoxide and hexafluoroisopropanol. While useful on occasion, major amounts of water are preferably avoided. Minor proportions of water may be present, however. Likewise, minor amounts of non-polar solvents such as benzene or hexene may be present. Most preferred solvents for this process are the lower oxahydrocarbons including monoalkanols of from 1 to 3 carbon atoms, and cyclic ethers such as tetrahydrofuran and dioxane.

The aluminum salts employed in the precipitation of the polycarboxylate starting materials must be salts or complexes which are soluble in the non-aqueous media. Examples of such salts and complexes are salts of carboxylic acids, such as acetates, butyrates, hexanoates, adipates, and citrates; alcoholates, such as ethylates, propylates, isopropylates, hexylates and phenylates; complexes, such as acetylacetanoates; and metal alkyls, such as triethylaluminum.

The mechanism involved in the reaction of the aluminum ions with the polyacid to form the starting materials is not known with certainty. It is known, however, that the aluminum ions, when added, react with the polymeric acids to a major extent intramolecularly, thus forming tiny particles of metal-polyacid complex. These particles then agglomerate to form the gelatinous intermediate material. The aluminum polycarboxylate starting materials which result after residual solvent removal are rigid, non-fusible and insoluble in water and other common solvents such as dioxane, and dimethylsulfoxide. They are porous, having specific surface areas of at least 5 $m^2/g$, preferably from 15 to 600 $m^2/g$, most preferably from 50 to 400 $m^2/g$, as measured by the B.E.T. method. This method is described in detail in Brunauer, S., Emmet, P. H., and Teller, E., *J. Am. Chem. Soc.*, 60, 309–16 (1938). They preferably contain from about 0.2 to 1.0 moles of aluminum ions per equivalent of acid polymerized acid.

THE ALPHA-ALUMINA PRODUCTION METHOD

In accordance with this invention high surface area alpha-aluminum is produced by thermally decomposing the above-described aluminum polycarboxylates up to 400°–600°C, heating the decomposition product to above about 1000°C and thereafter removing residual carbon by converting the carbon to gaseous carbon oxides at 400°–900°C.

The initial decompositin is carried out at temperatures up to about 400°C to about 600°C. Preferred temperatures are from about 450°C to about 550°C. The decomposition is generally carried out at low pressures, preferably at an absolute pressure of less than 100 mm, most preferably at an absolute pressure of from about 0.01 to about 20 mm of mercury. The decomposition is continued until there has been a substantially complete decarboxylation of the polymeric acid to give an aluminum-organic lattice. The time required for the decomposition depends in part both upon the temperature employed and the acids which make-up the polymeric acid. Generally, times of from about 0.5 to about fifteen hours are suitable with decomposition times of from one to five hours being preferred.

The product of the decomposition step is a porous carbonaceous powder containing minute particles of amorphous aluminum oxide.

The decomposition product is maintained at an elevated temperature in a non-oxidizing atmosphere in the second step of the process. This treatment must be carried out at a high enough temperature to cause the aluminum oxide formed in the decomposition step to undergo a phase change to alpha alumina. The carbonaceous matrix prevents extensive sintering of the aluminum oxide particles. Suitable temperatures generally range from about 900° to 1500°C. Preferred temperatures are from 1000° to 1400°C with temperatures from 1050° to 1350°C being most preferred.

The period of heating depends in part upon the temperatures employed. Generally, times of from 0.2 to about 10 hours are suitable. At the higher temperature, for example, 1200°–1500°C, times of from 0.2 to about 1.0 hours are preferred. At the lower temperatures, for example, 900°–1200°C, times of from about 1 to about 10 hours are preferred. At the temperatures within the preferred range, that is 1000°–1400°C, times selected from the range of 0.3 hours to 5 hours are preferred. While at the most preferred temperatures, that is 1050°–1350°C times of from 0.4 to 3 hours are preferred.

This heating is carried out in an inert atmosphere. Oxidizing atmospheres are to be avoided. Even water vapor will detrimentally oxidize the carbonaceous matrix at these high temperatures. Suitable dry atmospheres include nitrogen; the noble gases, especially argon and helium; methane and the like. Nitrogen, helium and argon are preferred inert atmospheres.

The product of this second step is a fine powder containing small particles of alpha-alumina in a carbonaceous matrix. This material, because of its substantial carbon content would not be suited for use in applications which require an essentially pure alpha-alumina, such as a support for catalysts.

The final step in the process of the invention is the removal of carbon from the hereinabove-produced carbon-contaminated alpha-alumina. The carbon is removed by converting it to a gaseous compound such as carbon dioxide or carbon monoxide. Any such method is suitable as long as the temperature required for that conversion is not substantially greater than about 800°C. Higher temperatures, for example, 1000° to 1100°C, cause decline in the surface area of the alpha-alumina through a sintering process. A particularly suitable method for removal of the carbon is to burn it off, preferably slowly, in the presence of air, optionally diluted with nitrogen, at about 400°–900°C, preferably 500°–800°C, thereby converting the carbon dioxide and/or carbon monoxide. The time required for removal of the carbon is not critical and will vary with the amount of material and the temperature. In most instances about one to twenty hours is sufficient. At the preferred temperatures, from 5 hours to 15 hours is preferred. The resulting product is an alpha alumina of relatively high surface area as measured by the B.E.T. method of at least about 40 $m^2/g$ and preferably of at least about 60 $m^2/g$.

The alpha alumina of relatively high surface area produced by the process of the invention is a material of established utility. For example, it may be used as a catalyst or catalyst support in processes conducted at 800°C or lower. As a catalyst support it is effective in oxidation reactions such as the oxidation of hydrocarbons to oxohydrocarbons, i.e., carbonyl- or carboxyl-containing hydrocarbons, hydrogen to water, and for the reduction of nitrogen oxides with appropriate reducing gases to produce hydrocyanic acid or to produce complete combustion and to produce harmless and deodorized gases. Also it can be used for hydrogenations such as the hydrogenation of benzene to cyclohexane or organic nitriles to amines such as acetonitrile to ethylamine. As a catalyst support it is effective in refinery hydrocarbon conversion processes.

High surface area alumina and other mineral compositions containing polyvalent metal ions can be similarly prepared by the inclusion of these ions in the initially precipitated ion-crosslinked polycarboxylate salt.

The invention will be described by the following examples which are provided for illustration and are not to be construed as limiting the invention.

EXAMPLE I

A. Polyacrylic acid feedstock was prepared by free radically polymerizing acrylic acid in p-dioxane solution at 100°C using conventional initiators such as azobisisobutyronitrile. These feedstocks had molecular weights in the range $10^4$–$10^6$.

A solution of 0.15 mole of aluminum isopropoxide in 1.0 l of dry isopropanol was added to a stirred solution of 32.4 g of polyacrylic acid (0.45 equiv. of —$CO_2H$) in 3.0 l of dry isopropanol over 90 minutes at 25–30°C. Then the gelationous slurry was heated up to 75°C over 80 minutes. The precipitate was isolated by centrifugation and was then washed with isopropanol. Following vacuum drying at 80°C, 38.4 g of aluminum ion cross-linked polyacrylate powder was recovered which had a surface area of 312 $m^2/g$ and contained 8.3%w alumina.

B. A 36.0 g portion of the aluminum ion cross-linked polyacrylate produced in A was thermally decomposed by heating it under pressures of 50 to 0.5 mm Hg (absolute) up to 510°C, this final temperature being held for 2 hours. A 58%w loss was observed and a carbonaceous residue was recovered which contained amorphous alumina inclusions. This latter product was heated in argon for 1 hour at 1250°C to convert the alumina into the alpha-crystalline form. Then the temperature was lowered to 550°C and air was admitted to burn off carbon over 13 hours. The final white powder had 17% of the weight of the original aluminum ion cross-linked polyacrylate, it had a surface area of 88 $m^2/g$ and it had an x-ray diffraction pattern showing alpha-$Al_2O_3$ to be present in crystallites of greater than 100A in size.

EXAMPLE II

A 2.0 g sample of aluminum ion cross-linked polyacrylate containing 8.4%w Al and having a surface area of 312 $m^2/g$ which was prepared according to part A of Example I, was heated under 50 to 0.5 mm Hg absolute pressure up to 410°C and was held at this temperature for 6 hours. A brown-black amorphous (to x-ray) residue weighing 0.73 g resulted. This carbonaceous residue was placed under oxygen at 1 atm, and slowly heated to 390°C. The sample ignited and burned rapidly; sample ignited and burned to produce a light grey powder (0.3%w C) which has a surface area of 89 $m^2/g$ and was indicated by x-ray diffraction to consist of approximately 1000A crystallites of alpha-alumina.

EXAMPLE III

A 4.3 g sample of aluminum ion cross-linked polyacylate containing 8.4%w Al and having a surface area of 312 $m^2/g$, which was prepared according to part A of Example I, was heated under 40 to 0.2 mm Hg absolute pressure up to 500°C to leave 1.5 g of black residue containing 41.3%w C and 3.3% w H. This latter black residue had a surface area of 330 $m^2/g$ and was amorphous to x-ray. This carbonaceous residue was heated to 400°C and nitrogen containing 3.5% v $O_2$, then 7.0% v $O_2$ and finally 21% v $O_2$ was admitted to oxidize the carbon in a carefully controlled manner without ignition. The resulting 0.51 g of light grey powder contained 2.9%w C and 1.4% w H and has a surface area of 333 $m^2/g$; by x-ray diffraction no crystallinity was observed in the residual alumina.

EXAMPLE IV

A 37.0 sample of aluminum ion cross-linked polyacylate containing 8.7% w Al and having a surface area of 238 $m^2/g$ was pyrolyzed under vacuum up to 500°C to leave 14.8 g of carbonaceous residue containing 50.8% w C and 2.3% w H. The latter was packed into a glass tube and a stream of oxygen forced through the bed; the side of the tube was heated with a torch to ignite the carbonaceous residue. Over about 5 minutes the latter burned vigorously with a white glow at temperatures estimated to be between 1250° and 1450°C. The resulting 5.9g of white sintered residue was alpha-alumina by x-ray diffraction but this had only 12 $m^2/g$ surface area.

EXAMPLE V

A. Over about 1.5 hours a solution of 28.8g of Cu[Al-(O-i-Pr)$_4$]$_2$ in 1.0 l of dioxane was added to a solution of 28.0g of polyacrylic acid in 3.0 l of p-dioxane at 50°C. The blue precipitate was separated by centrifugation and was washed in the p-dioxane similarly. After vacuum drying, 41.1 g of light blue powder containing 7.0% w Al and 7.1% w Cu and having a surface area of 179 $m^2/g$ was obtained.

B. The bottom of a pyrex tube was covered with 1.94 g of the above cupric and aluminum ion cross-linked polyacylate. The tube was filled with oxygen at 1 atm. absolute pressure and the side of the tube was warmed to ignite the powder. This glowed red and burned slowly over about five minutes to leave 0.40 g of a brown powder which showed the presence of about 1000A crystallites of alpha-$Al_2O_3$ and of CuO and about 100A crystallites of $CuAlO_2$ by x-ray diffraction.

I claim as my invention:

1. The process of producing alpha alumina of surface area at least about 40 $m^2/g$ which comprises:
   a. thermally decarboxylating a porous aluminum salt of polymerized unsaturated hydrocarbon carboxylic acid in vacuo at a temperature of from about 400°C to about 600°, said porous aluminum salt consisting of an aluminum-ion-linked salt of a polymerized monocarboxylic alkenoic acid of from about 500 to about 2,000,000 average molecular weight and containing from 3 to 6 carbon atoms per monomeric unit selected from the group consisting of acrylic acid, methacrylic acid, crotonic acid, maleic acid, sorbic acid and ethacrylic acid,
   b. heating the resulting decarboxylation product in an inert dry atmosphere to a temperature above about 1000°C, thereby converting the decarboxylation product to alpha alumina of said surface area and finally
   c. removing residual carbon from the alpha alumina product by conversion of the carbon to a gaseous carbon compound by heating said product in an oxygen containing atmosphere at a temperature not substantially greater than about 900°C.

2. The process in accord with claim 1 wherein the temperature in step (b) is from about 1000°C to about 1400°C.

3. The process in accord with claim 2 wherein carbon is converted to a gaseous carbon compound in step (c) by contacting the residual carbon with oxygen at a temperature of from about 400°C to about 900°C.

4. The process in accord with claim 1 wherein the porous aluminum salt of polymerized hydrocarbon carboxylic acid is an aluminum-ion-linked salt of polyacrylic acid, having from about 2,000 to about 500,000 average molecular weight, the temperature in step (b) is from about 1050°C to about 1350°c, and the temperature in step (c) is from about 500°C to about 800°C.

* * * * *